US010347250B2

(12) United States Patent
Cho et al.

(10) Patent No.: US 10,347,250 B2
(45) Date of Patent: Jul. 9, 2019

(54) UTTERANCE PRESENTATION DEVICE, UTTERANCE PRESENTATION METHOD, AND COMPUTER PROGRAM PRODUCT

(71) Applicants: KABUSHIKI KAISHA TOSHIBA, Minato-ku, Tokyo (JP); TOSHIBA DIGITAL SOLUTIONS CORPORATION, Kawasaki-shi, Kanagawa (JP)

(72) Inventors: Kenta Cho, Kawasaki Kanagawa (JP); Toshiyuki Kano, Kawasaki Kanagawa (JP)

(73) Assignees: KABUSHIKI KAISHA TOSHIBA, Tokyo (JP); TOSHIBA DIGITAL SOLUTIONS CORPORATION, Kawasaki-Shi (JP)

( * ) Notice: Subject to any disclaimer, the term of this patent is extended or adjusted under 35 U.S.C. 154(b) by 0 days.

(21) Appl. No.: 15/693,520

(22) Filed: Sep. 1, 2017

(65) Prior Publication Data
US 2017/0365258 A1 Dec. 21, 2017

Related U.S. Application Data

(63) Continuation of application No. PCT/JP2015/061269, filed on Apr. 10, 2015.

(51) Int. Cl.
*G06F 3/16* (2006.01)
*G06F 17/27* (2006.01)
(Continued)

(52) U.S. Cl.
CPC .............. *G10L 15/22* (2013.01); *G06F 3/167* (2013.01); *G06F 17/27* (2013.01); *G06F 17/279* (2013.01);
(Continued)

(58) Field of Classification Search
CPC ............... G10L 15/04; G10L 2015/088; G10L 2015/226; G10L 15/26; G10L 25/48
See application file for complete search history.

(56) References Cited

U.S. PATENT DOCUMENTS 7,296,218 B2 * 11/2007 Dittrich ............. G06F 17/30056
704/246
7,707,227 B2 * 4/2010 Shibata .................. G06Q 10/10
704/235
(Continued)

FOREIGN PATENT DOCUMENTS

JP 2008-140089 6/2008
JP 2008-172582 7/2008
(Continued)

OTHER PUBLICATIONS

Chambers, Bill, "The Portfolio & Writings of Bill Chambers", captured by Internet Archive on Mar. 9, 2015 [https://web.archive.org/web/20150315000000*/http://billchambers.me/tutorials/2014/12/21/tf-idf-explained-in-python.html]. (Year: 2015).*
(Continued)

*Primary Examiner* — Brian L Albertalli
(74) *Attorney, Agent, or Firm* — Amin, Turocy & Watson LLP

(57) ABSTRACT

According to an embodiment, an utterance presentation device includes an utterance recording unit, a voice recognition unit, an association degree calculation unit, and a UI control unit. The utterance recording unit is configured to record vocal utterances. The voice recognition unit is configured to recognize the recorded utterances by voice recognition. An association degree calculation unit is configured to calculate degrees of association of the recognized utterances with a character string specified from among character strings displayed in a second display region of a user interface (UI) screen having a first display region and
(Continued)

the second display region. A UI control unit is configured to display voice recognition results of utterances selected based on the degrees of association in the first display region of the UI screen.

15 Claims, 15 Drawing Sheets

(51) Int. Cl.
  *G10L 15/10* (2006.01)
  *G10L 15/22* (2006.01)
  *G10L 15/26* (2006.01)
(52) U.S. Cl.
  CPC .......... *G06F 17/2765* (2013.01); *G10L 15/10* (2013.01); *G10L 15/26* (2013.01); *G10L 2015/221* (2013.01)

(56) References Cited

U.S. PATENT DOCUMENTS

| | | | | |
|---|---|---|---|---|
| 8,862,473 | B2* | 10/2014 | Shinnishi | G10L 15/18 704/270 |
| 9,542,943 | B2* | 1/2017 | Harada | G10L 15/26 |
| 9,674,328 | B2* | 6/2017 | Juneja | G10L 15/30 |
| 9,858,259 | B2* | 1/2018 | Pottier | G06F 17/2765 |
| 2004/0064322 | A1* | 4/2004 | Georgiopoulos | G10L 15/26 704/277 |
| 2006/0100877 | A1* | 5/2006 | Zhang | G06Q 10/10 704/260 |
| 2006/0294453 | A1* | 12/2006 | Hirata | G10L 15/26 715/203 |
| 2007/0129942 | A1* | 6/2007 | Ban | G06F 17/241 704/235 |
| 2009/0234648 | A1* | 9/2009 | Nagatomo | G10L 15/22 704/235 |
| 2011/0282653 | A1* | 11/2011 | Tamura | G06F 17/2775 704/9 |
| 2012/0262533 | A1* | 10/2012 | Gannu | H04M 3/567 348/14.07 |
| 2014/0278377 | A1* | 9/2014 | Peters | G10L 15/1822 704/9 |
| 2016/0189103 | A1* | 6/2016 | Liu | G06Q 10/10 704/9 |
| 2016/0189107 | A1* | 6/2016 | Liu | G06Q 10/1091 704/214 |
| 2016/0189713 | A1* | 6/2016 | Liu | G06F 17/248 704/235 |
| 2016/0379169 | A1 | 12/2016 | Chiyo et al. | |

FOREIGN PATENT DOCUMENTS

| | | |
|---|---|---|
| JP | 2010-238050 | 10/2010 |
| JP | 2014-174465 | 9/2014 |
| JP | 2016-062196 | 4/2016 |

OTHER PUBLICATIONS

Blei, David M., Andrew Y. Ng, and Michael I. Jordan. "Latent dirichlet allocation." Journal of machine Learning research Jan. 3, 2003: 993-1022. (Year: 2003).*
International Search Report for International Patent Application No. PCT/JP2015/061269 dated Jun. 2, 2015, 1 page.
Written Opinion for International Patent Application No. PCT/JP2015/061269 dated Jun. 2, 2015, 4 pages.

* cited by examiner

FIG.6

IKEDA:

WE ARE GOING TO PERFORM A DEMONSTRATION OF VOICE RECOGNITION TECHNOLOGY IN THE EXHIBITION NEXT WEEK.

MS. TANAKA, WOULD YOU EXPLAIN THE DETAILS?

TANAKA:

I AM PLANNING TO DEMONSTRATE A SITUATION WHERE INSPECTION ITEMS TO BE CHECKED IN MAINTENANCE WORK ARE RECORDED ORALLY AND THE RECORDS ARE RECOGNIZED BY VOICE RECOGNITION.

I WILL PLACE ONE PC IN A BOOTH, AND PERFORM THE DEMONSTRATION THERE.

IKEDA:

ISN'T IT PERFORMANCE OF DEMONSTRATION INTENDED FOR MAINTENANCE WORK USING THE PC.

DO YOU HAVE ANY QUESTION ABOUT THE CONTENT OF THE DEMONSTRATION?

YAMAMOTO:

AREN'T WE GOING TO DEMONSTRATE SPEECH SYNTHESIS THIS TIME?

IKEDA:

WHAT ABOUT THE DEMONSTRATION OF SPEECH SYNTHESIS?

TANAKA:

WE WON'T DEMONSTRATE IT THIS TIME.

HOWEVER, I WOULD LIKE TO EXPLAIN IT AS A RELATED TECHNOLOGY.

YAMAMOTO:

MAY I PREPARE HANDOUTS ABOUT THE SPEECH SYNTHESIS?

IKEDA:

OH YES, LET'S EXPLAIN THE SPEECH SYNTHESIS USING HANDOUTS.

YAMAMOTO:

IS VOICE INPUT THROUGH HEADSETS?

TANAKA:

DOING SO SEEMS BETTER FOR SURELY INPUTTING VOICE.

IKEDA:

WE ALSO NEED TO PREPARE HEADSETS FOR VOICE INPUT.

IKEDA:

LET'S SUMMARIZE THE ACTION ITEMS.

MR. YAMAMOTO, PLEASE PRINT THE HANDOUTS ABOUT SPEECH SYNTHESIS.

MS. TANAKA, PLEASE PREPARE THE HEADSETS.

FIG.7

| UTTERANCE ID | DATE/TIME | SPEAKING USER | AUDIO FILE NAME | RECORDING MICROPHONE TYPE | MEETING ID |
|---|---|---|---|---|---|
| 1_s | 10:05:10 | 1_u | 1.wav | INDIVIDUAL MICROPHONE | 1_c |
| 2_s | 10:05:15 | 1_u | 2.wav | INDIVIDUAL MICROPHONE | 1_c |
| 3_s | 10:05:40 | 1_u | 3.wav | INDIVIDUAL MICROPHONE | 1_c |
| 4_s | 10:05:45 | 1_u | 4.wav | INDIVIDUAL MICROPHONE | 1_c |
| 5_s | 10:05:55 | 3_u | 5.wav | INDIVIDUAL MICROPHONE | 1_c |
| 6_s | 10:06:00 | -1_u | 6.wav | SOUND COLLECTING MICROPHONE | 1_c |
| 7_s | 10:06:05 | 1_u | 7.wav | INDIVIDUAL MICROPHONE | 1_c |
| 8_s | 10:06:25 | 3_u | 8.wav | INDIVIDUAL MICROPHONE | 1_c |
| 9_s | 10:06:35 | 1_u | 9.wav | INDIVIDUAL MICROPHONE | 1_c |
| 10_s | 10:06:45 | 3_u | 10.wav | INDIVIDUAL MICROPHONE | 1_c |
| 11_s | 10:06:55 | 1_u | 11.wav | INDIVIDUAL MICROPHONE | 1_c |
| 12_s | 10:07:00 | -1_u | 12.wav | SOUND COLLECTING MICROPHONE | 1_c |
| 13_s | 10:07:05 | 1_u | 13.wav | INDIVIDUAL MICROPHONE | 1_c |
| 14_s | 10:07:10 | 1_u | 14.wav | INDIVIDUAL MICROPHONE | 1_c |
| 15_s | 10:07:15 | 1_u | 15.wav | INDIVIDUAL MICROPHONE | 1_c |

| UTTERANCE ID | RECOGNITION RESULT | RECOGNITION KEYWORDS | ASSUMED RECOGNITION ACCURACY |
|---|---|---|---|
| 1_s | IN THE EXHIBITION NEXT WEEK OF VOICE RECOGNITION TECHNOLOGY WE ARE GOING TO PERFORM A DEMONSTRATION | NEXT WEEK, EXHIBITION VOICE RECOGNITION, TECHNOLOGY DEMO, DEMONSTRATION, PERFORM | 80% |
| 2_s | MS. TANAKA, WOULD YOU EXPLAIN THE DETAILS | TANAKA, EXPLAIN DETAILS | 80% |
| 3_s | ISN'T IT PERFORMANCE OF DEMONSTRATION INTENDED FOR MAINTENANCE WORK USING THE PC | DEMONSTRATION PC, LEAVE, MAINTENANCE WORK | 80% |
| 4_s | DO YOU HAVE ANY QUESTION ABOUT THE CONTENT OF THE DEMONSTRATION | QUESTION CONTENT, DEMONSTRATION | 80% |
| 5_s | AREN'T WE GOING TO DEMONSTRATE SPEECH SYNTHESIS THIS TIME | DEMONSTRATE SPEECH SYNTHESIS | 80% |
| 6_s |  | VOICE RECOGNITION, FACT TANAKA, EXPLAIN, ERGO MAINTENANCE WORK, CROSSROAD, SALAD VOICE RECOGNITION, DEMONSTRATION, INDEBTEDNESS LEAVE, MAINTENANCE WORK, DEMONSTRATION DEMO, DEMONSTRATION, QUESTION SPEECH SYNTHESIS, DEMONSTRATION | 30% |
| 7_s | WHAT ABOUT THE DEMONSTRATION OF SPEECH SYNTHESIS | DEMONSTRATION, SPEECH SYNTHESIS | 80% |
| 8_s | MAY I PREPARE HANDOUTS ABOUT THE SPEECH SYNTHESIS | PREPARE HANDOUTS, SPEECH SYNTHESIS | 80% |
| 9_s | OH YES, LET'S EXPLAIN THE SPEECH SYNTHESIS USING HANDOUTS | EXPLAIN SPEECH SYNTHESIS HANDOUTS | 80% |
| 10_s | IS VOICE INPUT THROUGH HEADSETS | VOICE, INPUT HEADSETS | 80% |
| 11_s | WE ALSO NEED TO PREPARE HEADSETS FOR VOICE INPUT | NEED, PREPARE HEADSETS, VOICE, INPUT | 80% |
| 12_s |  | SPEECH SYNTHESIS, DEMONSTRATION, COPPERPLATE IWATE, SPEECH SYNTHESIS, RELATED TECHNOLOGY, SPEECH SYNTHESIS, HANDOUTS, YOICHI SPEECH SYNTHESIS, HANDOUTS, DRIED SQUID VOICE, INPUT, HEADSETS, SHELL SURELY, VOICE, INPUT VOICE, INPUT, HEADSETS, PREPARE | 30% |
| 13_s | LET'S SUMMARIZE THE ACTION ITEMS | SUMMARIZE ACTION ITEMS | 80% |
| 14_s | MR. YAMAMOTO, PLEASE PRINT THE HANDOUTS ABOUT SPEECH SYNTHESIS | YAMAMOTO, PRINT, HANDOUTS SPEECH SYNTHESIS | 80% |
| 15_s | MS. TANAKA, PLEASE PREPARE THE HEADSETS | TANAKA, PREPARE HEADSETS | 80% |

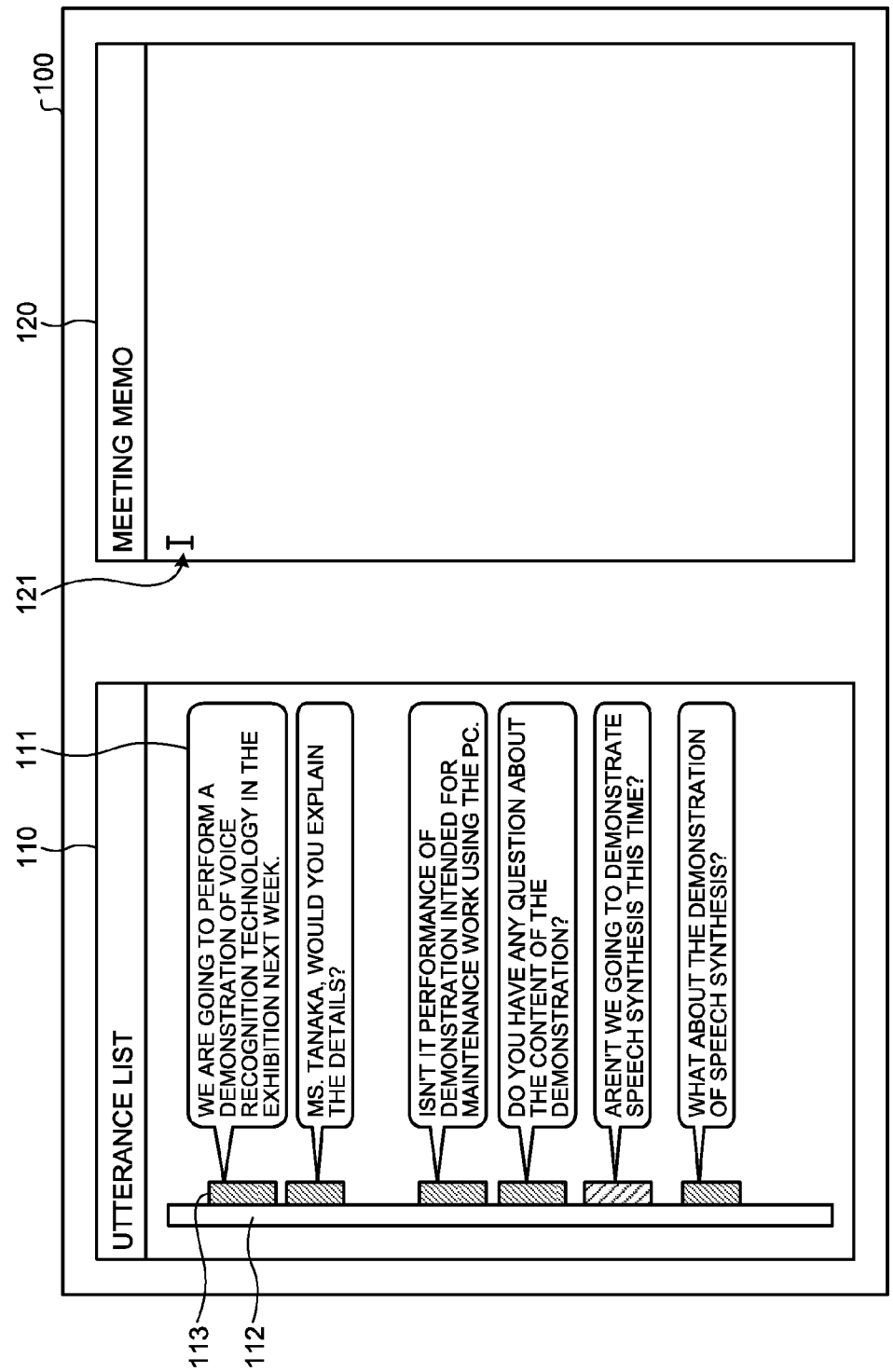

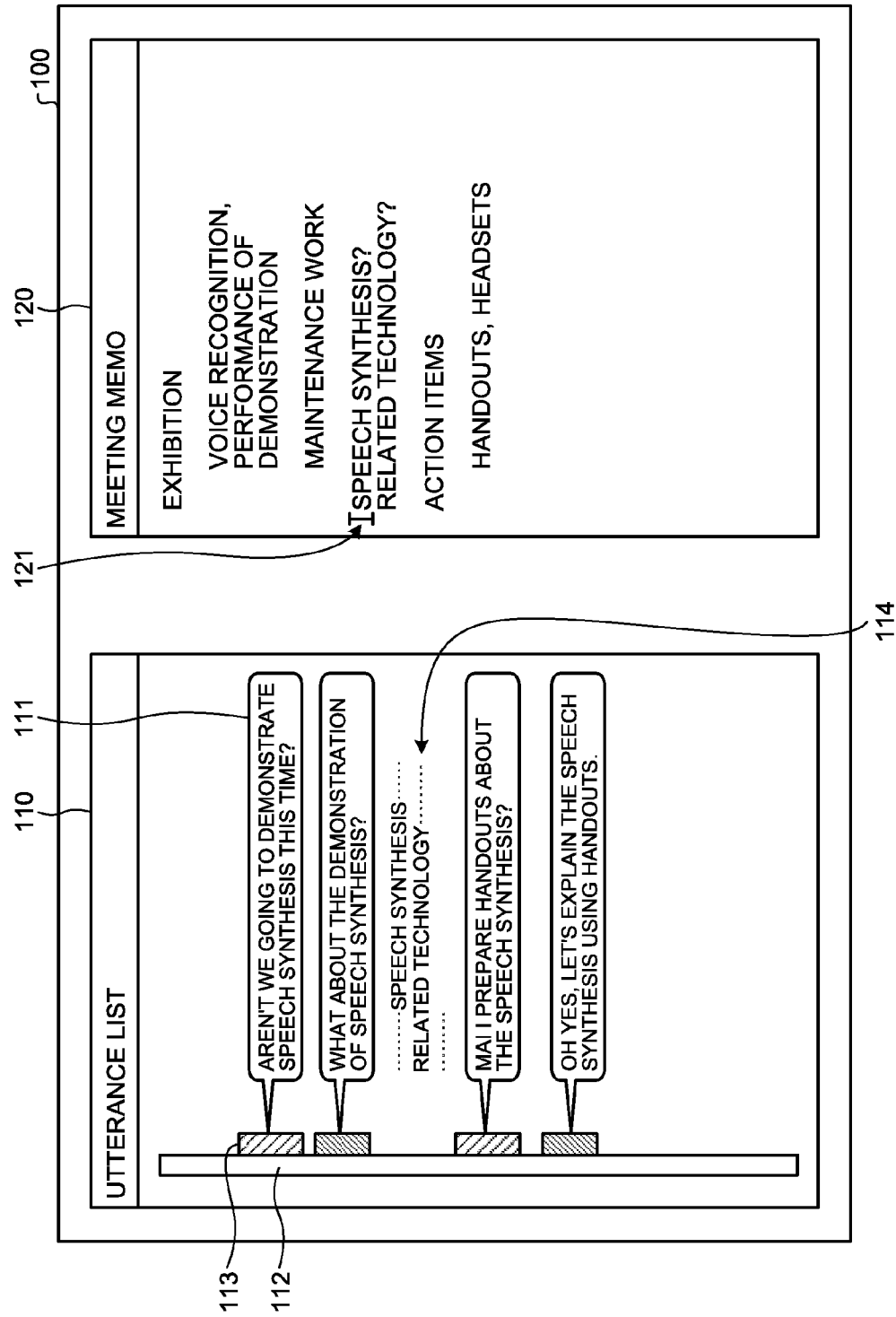

FIG.11

| MEMO ID | LINE | TEXT | MEETING ID |
|---|---|---|---|
| 1_m | 1 | EXHIBITION | 1_c |
| 2_m | 2 | VOICE RECOGNITION, PERFORMANCE OF DEMONSTRATION | 1_c |
| 3_m | 3 | MAINTENANCE WORK | 1_c |
| 4_m | 4 | SPEECH SYNTHESIS? RELATED TECHNOLOGY? | 1_c |
| 5_m | 5 | ACTION ITEMS | 1_c |
| 6_m | 6 | HANDOUTS, HEADSETS | 1_c |
| ⋮ | ⋮ | ⋮ | ⋮ |

FIG.15

| DATA ID | RECORDING MICROPHONE TYPE | SPEAKING USER | PLACE | POST-PROCESSING | ASSUMED RECOGNITION ACCURACY |
|---|---|---|---|---|---|
| 1_d | INDIVIDUAL MICROPHONE | * | * | NO | 80% |
| 2_d | SOUND COLLECTING MICROPHONE | * | * | NO | 30% |
| 3_d | INDIVIDUAL MICROPHONE | 2_u | * | NO | 90% |
| 4_d | INDIVIDUAL MICROPHONE | * | SERVER ROOM | NO | 60% |
| 5_d | SOUND COLLECTING MICROPHONE | * | * | SPEAKER VERIFICATION | 50% |

UTTERANCE PRESENTATION DEVICE, UTTERANCE PRESENTATION METHOD, AND COMPUTER PROGRAM PRODUCT

CROSS-REFERENCE TO RELATED APPLICATIONS

The present application is a continuation application of International Application No. PCT/JP2015/061269, filed Apr. 10, 2015, the entire contents of which are incorporated herein by reference.

FIELD

Embodiments of the present invention generally relate to an utterance presentation device, an utterance presentation method, and a program.

BACKGROUND

For example, to increase operation efficiency in creation of minutes of a meeting, it is effective to identify which memo written during the meeting is associated with which utterance in the meeting. A technique for making such association is known in which the input time of the memo entered as a text is recorded in association with a record of voice and video during the meeting, and the memo part displayed at the time of reproduction of the recorded voice and video or the voice and the video associated with the memo are reproduced.

However, information desired to be associated with the utterance during the meeting is not limited to the memo entered as the text during the meeting. For example, in some cases, information not entered during the meeting, such as a handwritten memo written on paper during the meeting or an agenda created before the meeting, is desired to be associated with the utterance during the meeting. Various systems having a mechanism of recording vocal utterances need to have a capability of user friendly presentation of not only utterances during the meeting, but also utterances associated with any information.

BRIEF DESCRIPTION OF THE DRAWINGS

FIG. 6 is a diagram illustrating a specific example of the utterances during the meeting.

FIG. 7 is a diagram illustrating a specific example of utterance data.

FIG. 8 is a diagram illustrating a specific example of utterance recognition data.

FIG. 9 is a diagram illustrating an example of a user interface (UI) screen.

FIG. 10 is a diagram illustrating the UI screen on which meeting memos have been written in a "meeting memo" region.

FIG. 11 is a diagram illustrating a specific example of input text data.

FIG. 15 is a diagram illustrating a specific example of sound recording environment data.

DETAILED DESCRIPTION

According to an embodiment, an utterance presentation device includes an utterance recording unit, a voice recognition unit, an association degree calculation unit, and a UI control unit. The utterance recording unit is configured to record vocal utterances. The voice recognition unit is configured to recognize the recorded utterances by voice recognition. An association degree calculation unit is configured to calculate degrees of association of the recognized utterances with a character string specified from among character strings displayed in a second display region of a user interface (UI) screen having a first display region and the second display region. A UI control unit is configured to display voice recognition results of utterances selected based on the degrees of association in the first display region of the UI screen.

The following describes in detail an utterance presentation device, an utterance presentation method, and a computer program according to embodiments of the present invention with reference to the drawings. The embodiments to be described below exemplify the utterance presentation device configured to record vocal utterances during a meeting, and to present, when meeting memos are created after the meeting, utterances in the meeting associated with specified memo parts. This utterance presentation device is implemented, for example, as a server device of a server-client system using a network, and provides a service, such as displaying a user interface (UI) screen (to be described later) on a client terminal and performing processing based on operations through the UI screen. The utterance presentation device may be a virtual machine operating in a cloud system. Otherwise, the utterance presentation device may be a stand-alone device directly used by a user.

First Embodiment

Figure 1:
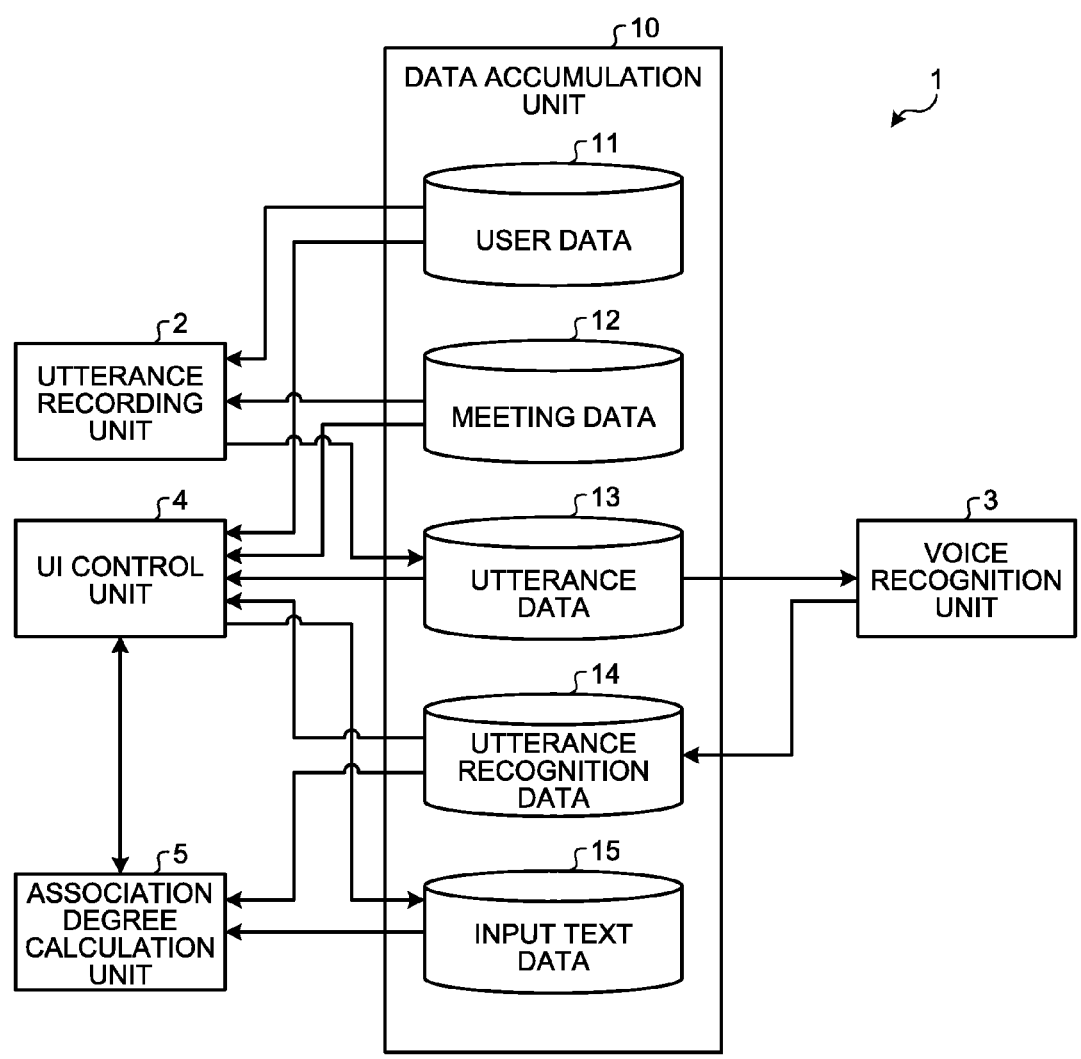
FIG. 1 is a block diagram illustrating a configuration example of an utterance presentation device according to a first embodiment of the present invention.

FIG. 1 is a block diagram illustrating a configuration example of an utterance presentation device 1 according to a first embodiment of the present invention. As illustrated in FIG. 1, the utterance presentation device 1 includes an utterance recording unit 2, a voice recognition unit 3, a UI control unit 4, an association degree calculation unit 5, and a data accumulation unit 10.

The utterance recording unit 2 records the vocal utterances produced during the meeting. Each of the utterances is entered into an individual microphone, such as a pin microphone or a microphone of a headset worn by a speaking user who has made the utterance, or by a sound collecting microphone. The utterance entered into the individual microphone or the sound collecting microphone is transmitted to the utterance presentation device 1 together with, for example, the date and time of occurrence of the utterance and a user identification (ID) for identifying the user. The utterance recording unit 2 records the received voice as an audio file.

The audio file of the utterance recorded by the utterance recording unit 2 is accumulated in the data accumulation unit 10 as utterance data 13 together with, for example, an utterance ID for identifying the utterance, the date and time of occurrence of the utterance, the user ID of the speaking user, the type (recording microphone type) of a microphone used for recording the utterance, and a meeting ID for identifying the meeting in which the utterance was made. The recording microphone type is identified, for example, by referring to user data 11 stored in the data accumulation unit 10 according to a registration operation made by the user before the meeting is held. The meeting ID is identified, for example, by referring to meeting data 12 stored in the data accumulation unit 10 according to the registration operation made by the user before the meeting is held.

The voice recognition unit 3 performs voice recognition on the utterances recorded by the utterance recording unit 2. Since a known technology can be directly used as a method for the voice recognition, detailed description thereof will not be made herein. The voice recognition unit 3 outputs, as a voice recognition result, for example, a candidate having the maximum likelihood among candidates for the recognition result of the entered voice of the utterance, and outputs all words included in the respective candidates as recognition keywords.

The voice recognition result and the recognition keywords of the utterance output from the voice recognition unit 3 are accumulated in the data accumulation unit 10 as utterance recognition data 14 together with, for example, the utterance ID for identifying the utterance and assumed recognition accuracy representing assumed accuracy of voice recognition. The assumed recognition accuracy is set, for example, according to the input method of the voice of the utterance (specifically, the recording microphone type).

The UI control unit 4 generates the UI screen for supporting the user to create a meeting memo, and provides the UI screen to the client terminal. The UI screen has an "utterance list" region (first display region) for displaying the voice recognition results of the utterances during the meeting and a "meeting memo" region (second display region) for receiving input of the meeting memo. The voice recognition results of the utterances recorded during the meeting is displayed in the "utterance list" region of the UI screen. The "meeting memo" region of the UI screen is used by the user to enter the meeting memo of the meeting. The meeting memo entered by the user is displayed as a text in the "meeting memo" region. The "meeting memo" region may be configured to display other texts, such as an agenda registered before the meeting, related to the meeting, in addition to the meeting memo. The meeting memo entered into the "meeting memo" region by the user is managed, for example, line by line, and is accumulated in the data accumulation unit 10 as input text data 15 together with, for example, a memo ID for identifying the memo part in each line, the entered line, the meeting ID for identifying the meeting corresponding to the meeting memo.

If the user performs an operation to specify any character string from the text displayed in the "meeting memo" region of the UI screen, the UI control unit 4 displays, in the "utterance list" region of the UI screen, voice recognition results of utterances selected based on the degree of association with the specified character string from among utterances that have been recorded during a corresponding meeting and that have been subjected to the voice recognition by the voice recognition unit 3. The degree of association with the character string specified in the "meeting memo" region is calculated by the association degree calculation unit 5 (to be described later). Moreover, if the user performs an operation to specify any utterance from among the utterances with the voice recognition results displayed in the "utterance list" region of the UI screen, the UI control unit 4 performs control to reproduce the voice of the utterance.

The UI control unit 4 is implemented, for example, as a web server that generates the UI screen in a web-based way, and provides it to the client terminal. In this case, the client terminal uses the UI screen generated by the UI control unit 4 through the network using a web browser. Details of a specific configuration example of the UI screen will be described later.

If the user performs the operation to specify any character string from the text displayed in the "meeting memo" region of the UI screen, the association degree calculation unit 5 calculates the degree of association of each of the utterances in the meeting that have been recorded during the corresponding meeting and that have been subjected to the voice recognition by the voice recognition unit 3 with the specified character string. Based on the degree of association calculated by the association degree calculation unit 5, an utterance with the voice recognition result displayed in the "utterance list" region of the UI screen is selected as an utterance corresponding to the character string specified in the "meeting memo" region of the UI screen. Details of a specific example of a method for calculating the degree of association will be described later.

Figure 2A:
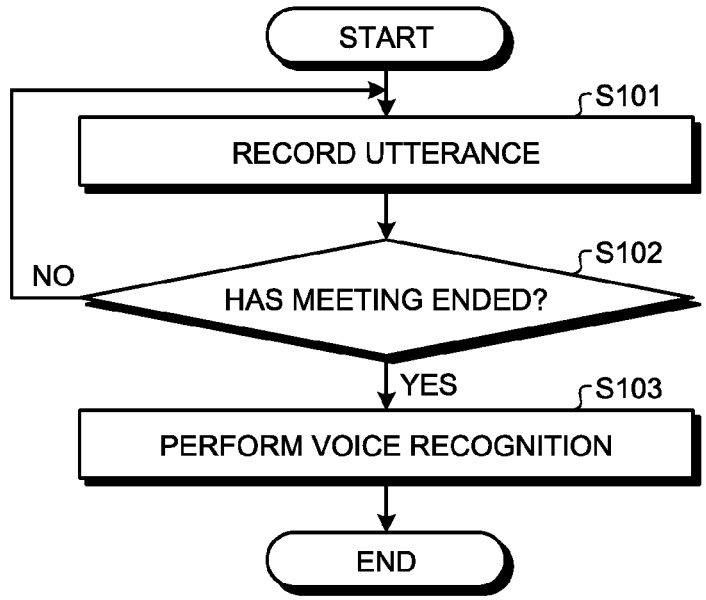
FIGS. 2A and 2B are flowcharts illustrating schematic operations of the utterance presentation device according to the embodiment.
Figure 2B:
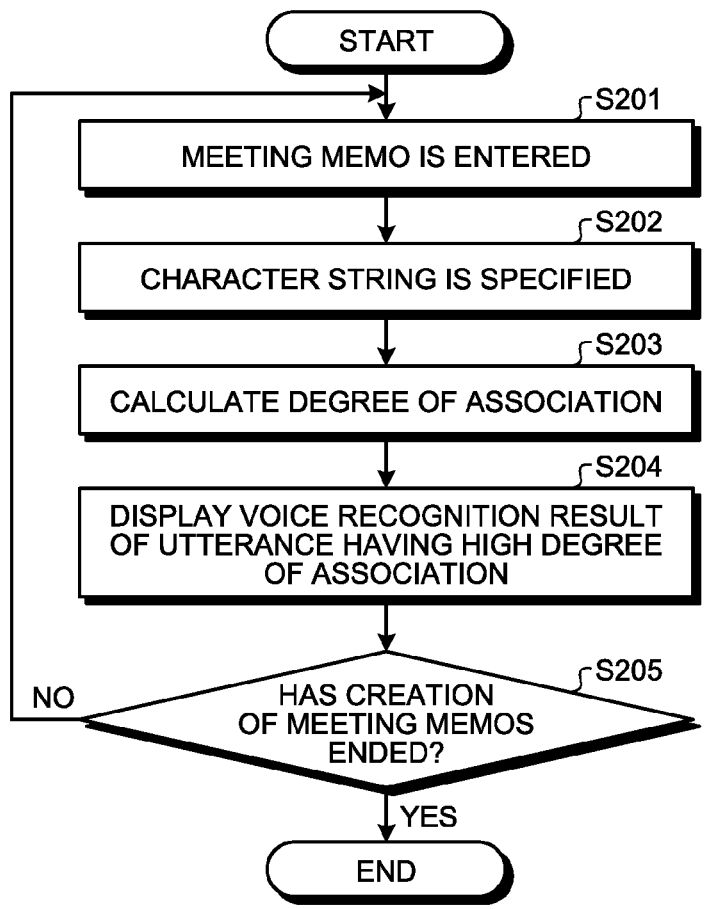

The following briefly describes flows of operations performed by the utterance presentation device 1 of the present embodiment. FIGS. 2A and 2B are flowcharts illustrating schematic operations of the utterance presentation device 1 according to the present embodiment, FIG. 2A illustrating an operation performed each time a meeting is held, and FIG. 2B illustrating an operation of the utterance presentation device 1 when the UI screen is opened on the client terminal after the meeting.

Information on users (meeting participants) who use individual microphones to make utterances during the meeting and information on the meeting to be held are assumed to be registered before the meeting by accessing the utterance presentation device 1 from the client terminal. The registered information on the meeting participants is stored as the user data 11 in the data accumulation unit 10, and the registered information on the meeting is stored as the meeting data 12 in the data accumulation unit 10.

After the meeting starts, a vocal utterance during the meeting is entered into an individual microphone or the sound collecting microphone, and transmitted from the client terminal to the utterance presentation device 1. The utterance recording unit 2 of the utterance presentation device 1 records the utterance entered into the individual microphone or the sound collecting microphone as the audio file (Step S101). The audio file of the utterance recorded by the utterance recording unit 2 is stored as the utterance data 13 in the data accumulation unit 10.

The utterance recording unit 2 continues to record the utterance and store the utterance data 13 until the meeting ends. That is, a determination is made as to whether the meeting is ended, for example, based on whether a user has performed an explicit operation indicating the end of the meeting (Step S102), and, if the meeting is not ended (No at Step S102), the processing of Step S101 is repeated by the utterance recording unit 2 each time an utterance in the meeting is entered into an individual microphone or the sound collecting microphone. If the meeting is ended (Yes at Step S102), the voice recognition unit 3 performs the voice recognition on the respective utterances during the meeting accumulated as the utterance data 13 in the data accumulation unit 10 (Step S103). The voice recognition results and the recognition keywords of the utterances obtained by the voice recognition performed by the voice recognition unit 3 are stored as the utterance recognition data 14 in the data accumulation unit 10. The voice recognition unit 3 may perform the voice recognition on the utterances in the meeting during the meeting.

After the meeting is ended, if creation of meeting memos is requested by the client terminal, the UI control unit 4 of the utterance presentation device 1 displays the UI screen on the client terminal. If a user performs an operation to enter a meeting memo into the "meeting memo" region of the UI screen (Step S201), a text thereof is displayed in the "meeting memo" region, and the entered meeting memo is stored as the input text data 15 in the data accumulation unit 10.

Then, if the user performs an operation to specify any character string from the text displayed in the "meeting memo" region (Step S202), the association degree calculation unit 5 calculates the degree of association of each of the utterances recorded during the meeting with the specified character string (Step S203). The UI control unit 4 selects an utterance having a high degree of association calculated by the association degree calculation unit 5 as an utterance to be displayed, and displays the voice recognition result of the selected utterance in the "utterance list" region of the UI screen (Step S204). The user who creates the meeting memo can visually check the utterance in the meeting corresponding to the character string specified in the "meeting memo" region, by referring to the voice recognition result of the utterance in the "utterance list" region. The user who creates the meeting memo can also auditorily check, as needed, the utterance in the meeting corresponding to the character string specified in the "meeting memo" region, by specifying any of the utterances with the voice recognition results displayed in the "utterance list" region, and reproducing the voice of the utterance.

Then, a determination is made as to whether the creation of meeting memos is ended, for example, based on whether the user has performed an explicit operation indicating the end of the creation of meeting memos (Step S205), and, if the creation of meeting memos is not ended (No at Step S205), the processing of Steps S201 to S204 is repeated. If the creation of meeting memos is ended (Yes at Step S205), the series of operations performed by the utterance presentation device 1 end.

The following describes the operations performed by the utterance presentation device 1 of the present embodiment more in detail by exemplifying a specific example of a meeting.

Figure 3:
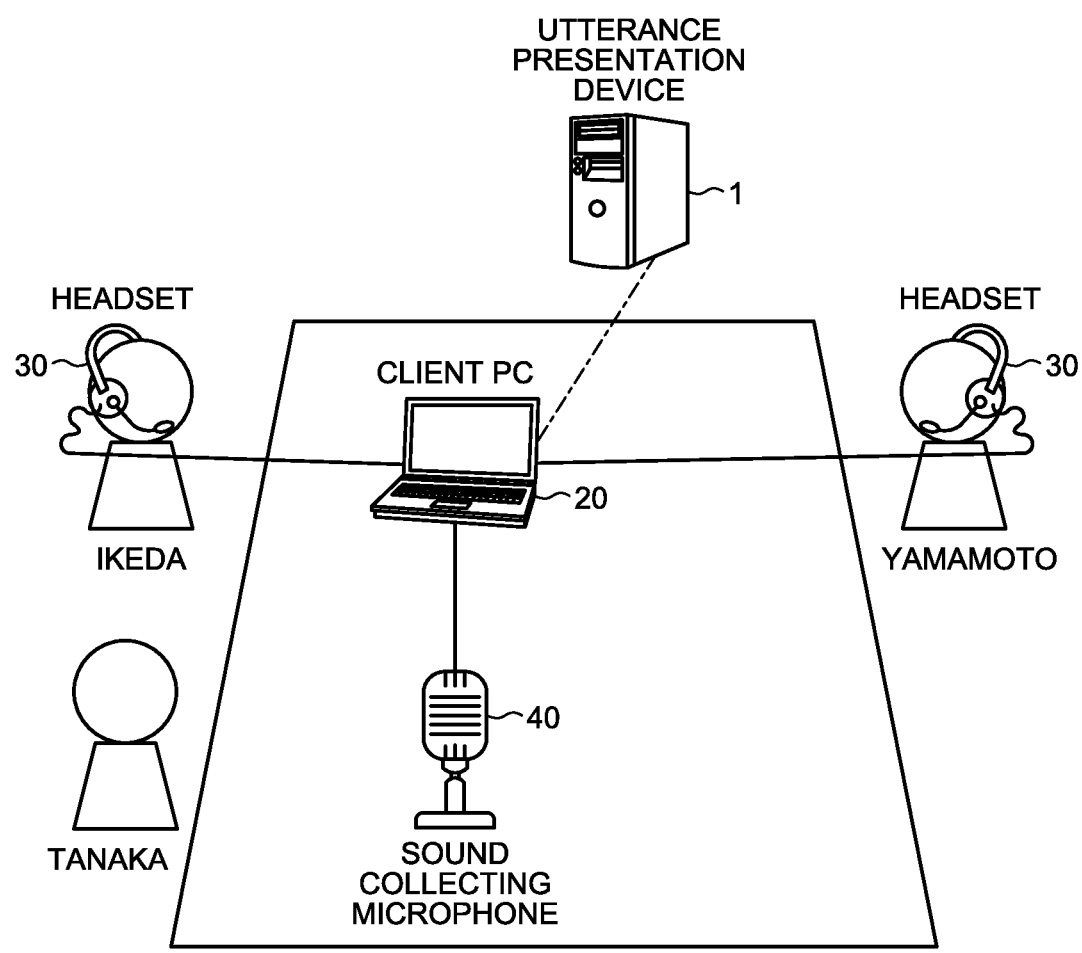
FIG. 3 is a diagram explaining a specific example of a scene in which utterances during a meeting are recorded.

FIG. 3 is a diagram explaining a specific example of a scene in which utterances during the meeting are recorded. FIG. 3 illustrates a state where the meeting is held in a meeting room by three people, named "Ikeda", "Yamamoto", and "Tanaka". A client personal computer (PC) 20 connected to the utterance presentation device 1 of the present embodiment through a network is placed on a table of the meeting room. Of the meeting participants, both "Ikeda" and "Yamamoto" wear headsets 30. An utterance of "Ikeda" and an utterance of "Yamamoto" are entered into respective individual microphones of the headsets 30. A sound collecting microphone 40 is placed on the table in the meeting room. An utterance of "Tanaka" who does not wear the headset 30 is entered into the sound collecting microphone 40. The sound collecting microphone 40 receives all voices produced during the meeting, including not only the utterances of "Tanaka" not wearing the headset 30, but also the utterances of "Ikeda" and "Yamamoto" each wearing the headset 30.

The headsets 30 worn by "Ikeda" and "Yamamoto" and the sound collecting microphone 40 placed on the table are connected to the client PC 20. The utterances during the meeting entered into the headsets 30 and the sound collecting microphone 40 are transmitted from the client PC 20 through the network to the utterance presentation device 1. The client PC 20 is exemplified herein as an example of the client terminal. However, the client terminal is not limited thereto. For example, other terminals, such as a tablet computer and a terminal for videoconference, can be used as the client terminal.

Although the scene is assumed herein in which all the meeting participants meet in one meeting room, the utterance presentation device 1 of the present embodiment also effectively operates in the case where a remote meeting is held between geographically distant points. In this case, it is only necessary to place a terminal, such as the client PC 20 connected to the utterance presentation device 1 of the present embodiment through the network, at each of the points where the remote meeting is held, and to connect the headsets 30 worn by meeting participants at each of the points and the sound collecting microphone 40 to the terminal at each of the points.

In the case of recording the utterances during the meeting using the utterance presentation device 1 of the present embodiment, at least users among the meeting participants who use the individual microphones to record the utterances thereof and the meeting to be held are registered before the meeting is held. The registration of the users can be performed using a simple method in which, for example, a user uses the client PC 20 to access the utterance presentation device 1, and enters his or her name on a user registration screen provided from the utterance presentation device 1 to the client PC 20. The registered user is assigned with a unique user ID, which is stored in the data accumulation unit 10 as the user data 11 together with the entered name.

Figure 4:
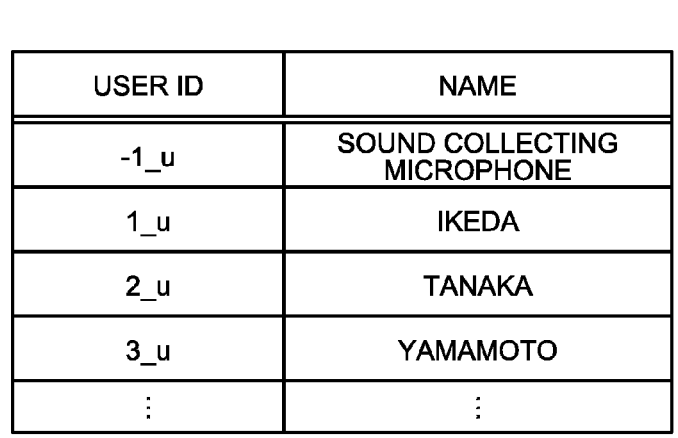
FIG. 4 is a diagram illustrating a specific example of user data.

FIG. 4 is a diagram illustrating a specific example of the user data 11 stored in the data accumulation unit 10. The user data 11 is stored in the data accumulation unit 10 in the form of associating the user ID with the name of the registered user, for example, as illustrated in FIG. 4. The user data 11 includes a "sound collecting microphone" user as a special user provided for distinguishing the utterances recorded using the sound collecting microphone 40. In the example of the user data 11 illustrated in FIG. 4, the user ID of the "sound collecting microphone" user is "−1_u". The form of FIG. 4 is merely an example. The user data 11 may include other information, such as an account name and a password used when each of the users logs into the utterance presentation device 1 and e-mail addresses.

The registration of the meeting can be performed using a simple method in which, for example, one of the meeting participants uses the client PC 20 to access the utterance presentation device 1, and enters names of the meeting participants and the title of the meeting on a meeting setting screen provided from the utterance presentation device 1 to the client PC 20. "Sound collecting microphone" is entered as the name of a meeting participant ("Tanaka", in the example of FIG. 3) who does not wear the headset 30. The names of the meeting participants entered on the meeting setting screen are converted into the user IDs using the user data 11 described above. The registered meeting is assigned with a unique meeting ID, which is stored in the data accumulation unit 10 as the meeting data 12 together with the user IDs of the meeting participants and the entered title of the meeting.

Figure 5:
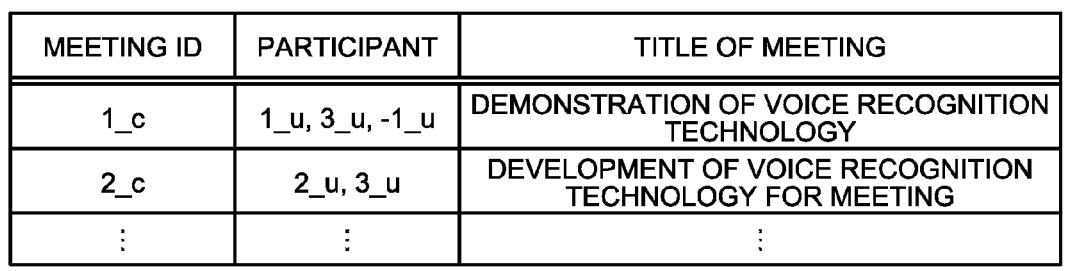
FIG. 5 is a diagram illustrating a specific example of meeting data.

FIG. 5 is a diagram illustrating a specific example of the meeting data 12 stored in the data accumulation unit 10. The example of the meeting data 12 of FIG. 5 illustrates that two meetings are registered, and the meeting participants are managed using user IDs in the user data 11. The example illustrates that, of these meetings, a meeting with a meeting ID of "1_c" corresponds to the example of FIG. 3, and that "Ikeda" and "Yamamoto" participate in the meeting and voices are recorded using the sound collecting microphone 40 because the user IDs of the meeting participants are "1_u", "3_u", and "–1_u". The form of FIG. 5 is merely an example. The meeting data 12 may include other information, such as the agenda, related keywords, and the date and time of the meeting.

After the meeting actually starts after the registration of the meeting, the vocal utterances during the meeting are entered into the individual microphones and the sound collecting microphone. FIG. 6 is a diagram illustrating a specific example of the utterances during the meeting, and illustrates utterance examples recorded in the environment illustrated in FIG. 3. The utterances of "Ikeda" and the utterances of "Yamamoto" are entered into the individual microphones of the headsets 30 worn by them. It is assumed that information indicating which of the users uses each of the headsets 30 has been registered in advance in the client PC 20, and an utterance entered into an individual microphone of either of the headsets 30 is transmitted to the utterance presentation device 1 together with the user ID of the user using the headset 30. The utterances of the three people including "Tanaka" are entered into the sound collecting microphone 40, and transmitted to the utterance presentation device 1 together with the user ID of the "sound collecting microphone" user. In the utterance presentation device 1, the utterances received from the client PC 20 are recorded as audio files and stored as the utterance data 13 in the data accumulation unit 10 by the utterance recording unit 2.

FIG. 7 is a diagram illustrating a specific example of the utterance data 13 accumulated in the data accumulation unit 10, and illustrates the utterance data 13 corresponding to the utterance examples of FIG. 6. The utterance data 13 is stored in the data accumulation unit 10 in the form of associating with one another a unique utterance ID assigned to each of the utterances, the date and time of occurrence of the utterance, the user ID of the speaking user, the file name of the audio file recording the utterance, the recording microphone type, and the meeting ID of the meeting in which the utterance was made, for example, as illustrated in FIG. 7.

The date and time of occurrence of the utterance may be information appended to the utterance and transmitted from the client PC 20, or information given when the utterance presentation device 1 has received the utterance. The recording microphone type can be obtained, for example, by referring to the user data 11 based on the user ID appended to the utterance and transmitted from the client PC 20. The meeting ID can be obtained from the registered meeting data 12.

Utterances with the recording microphone type thereof being "individual microphone" are each recorded in the form divided into utterances of one sentence based on, for example, silent intervals or explicit input operations of start and end of each utterance performed by a user. In contrast, utterances with the recording microphone type thereof being "sound collecting microphone" are recorded in the form collected in a predetermined recording unit, such as one minute. For example, an utterance with an utterance ID of "6_s" illustrated in FIG. 7 is an utterance recorded using the sound collecting microphone 40 between 10:05:00 and 10:06:00. The form of FIG. 7 is merely an example. The utterance data 13 may include other information.

After the end of the meeting, if, for example, the client PC 20 notifies the utterance presentation device 1 of the end of the meeting according to an operation by one of the meeting participants, the voice recognition unit 3 of the utterance presentation device 1 performs the voice recognition on the utterances. The voice recognition results and the recognition keywords of the utterances output from the voice recognition unit 3 are stored as the utterance recognition data 14 in the data accumulation unit 10. The voice recognition on the utterances performed by the voice recognition unit 3 may be performed during the meeting in conjunction with the recording of the utterances by the utterance recording unit 2.

FIG. 8 is a diagram illustrating a specific example of the utterance recognition data 14, and illustrates the utterance recognition data 14 corresponding to the utterance examples of FIG. 6. The utterance recognition data 14 is stored in the data accumulation unit 10 in the form of associating with one another the utterance ID of each of the utterances, a text of the voice recognition result (recognition result) of the utterance, the recognition keywords, and the assumed recognition accuracy representing the assumed accuracy of voice recognition, for example, as illustrated in FIG. 8.

The recognition result is the text of a candidate having the maximum likelihood among candidates for the recognition result. For ease of explanation, all the recognition results illustrated in FIG. 8 represent examples obtained by correct voice recognition. Actually, however, the recognition results may include errors under the influence of the environment of recording of the utterances or the way of speaking of the users, in some cases. For utterances with the assumed recognition accuracy of below 50% (to be described later), the recognition results are not stored, and only the recognition keywords are stored. For example, since the assumed recognition accuracy of the utterance ID "6_s" and the utterance ID "12_s" illustrated in FIG. 8 is 30%, that is, below 50%, the recognition results thereof are not stored, and only the recognition keywords thereof are stored.

The recognition keywords are extracted from words included in the candidates for the recognition results. Examples of methods for extracting the recognition keywords include a method of extracting only nouns from morphological information included in the candidates for the recognition results. For example, a method may be used in which frequently appearing general nouns are excluded from the recognition keywords. Each of the recognition keywords extracted from the candidates for the recognition results is preferably stored together with an occurrence time during utterance that represents how many seconds had elapsed from the start time of a corresponding utterance until the recognition keyword was uttered.

The assumed recognition accuracy is an assumed value representing the accuracy of the voice recognition by the voice recognition unit 3. The accuracy of the voice recognition depends on the recording environment of the voice.

Hence, using, for example, the recording microphone type, the assumed recognition accuracy can be set to a high value of 80% for the individual microphone that individually receives the voice from the vicinity of the mouth a user, and to a low value of 30% for the sound collecting microphone that may simultaneously receive utterances of a plurality of users at a location distant from the vicinities of the mouths. The method for setting the assumed recognition accuracy is not limited to this method. The assumed recognition accuracy may be set taking into account other information related to the accuracy of the voice recognition. The form of FIG. 8 is merely an example. The utterance recognition data 14 may include other information. The utterance recognition data 14 may be configured to be stored in the data accumulation unit 10 together with the utterance data 13.

After the end of the meeting, if a user who creates the meeting memos uses the client PC 20 to access the utterance presentation device 1, and requests the creation of the meeting memos by specifying the meeting, the UI control unit 4 of the utterance presentation device 1 collects data related to the specified meeting from the data accumulation unit 10, and generates the UI screen and provides it to the client PC 20. The UI screen provided by the UI control unit 4 of the utterance presentation device 1 is displayed on the client PC 20.

FIG. 9 is a diagram illustrating an example of the UI screen displayed on the client PC 20. This UI screen 100 illustrated in FIG. 9 has a screen configuration including an "utterance list" region 110 on the left side of the screen and a "meeting memo" region 120 on the right side of the screen. The "utterance list" region 110 displays recognition results 111 of the utterance recognition data 14 from the top downward in the chronological order of occurrence of the utterances. A bar 112 disposed at the left end of the utterance list" region 110 represents voices of the entire meeting recorded using the sound collecting microphone 40, and bars 113 colored in different colors arranged on the right side of the bar 112 represent utterances of the respective users recorded using the individual microphones of the headsets 30. The bars 112 and 113 are configured such that clicking any of the bars 112 and 113 reproduces a voice from the time corresponding to the clicked position.

The "meeting memo" region 120 is a region into which the user who creates the meeting memos enters any text. A cursor 121 for text input is located in the "meeting memo" region 120. As illustrated in FIG. 9, nothing is displayed in the "meeting memo" region 120 on the UI screen 100 that is first displayed in response to a request of the user. If, however, the agenda of the meeting is registered as the meeting data 12, the content of the agenda may be displayed in the "meeting memo" region 120 as an initial text. The user who creates the meeting memos can enter any text as the meeting memos in the "meeting memo" region 120 by referring to, for example, handwritten memos written on a memo pad or the like during the meeting. The meeting memos entered into the "meeting memo" region 120 are displayed as texts in the "meeting memo" region 120. The meeting memos can be entered into the "meeting memo" region 120 during the meeting. That is, the UI screen 100 can be displayed on the client PC 20 during the meeting, and the meeting memos can be directly entered into the "meeting memo" region 120 using a keyboard or the like while the meeting is held.

The meeting memos entered into the "meeting memo" region 120 of the UI screen 100 are stored in the data accumulation unit 10, for example, as the input text data 15 on a line-by-line basis. FIG. 10 is a diagram illustrating the UI screen 100 on which the meeting memos have been written in the "meeting memo" region 120. FIG. 11 is a diagram illustrating a specific example of the input text data 15 stored in the data accumulation unit 10, and illustrates the input text data 15 corresponding to the meeting memos of FIG. 10. The input text data 15 is stored in the data accumulation unit 10 in the form of associating with one another the unique memo ID, the line into which the text is entered, the content of the text, the meeting ID of the meeting for which the meeting memo is created, for example, as illustrated in FIG. 11. The form of FIG. 11 is merely an example. The input text data 15 may include other information.

After the meeting memos are entered into the "meeting memo" region 120 of the UI screen 100, if the user performs an operation to move the cursor 121 so as to perform an operation to specify any character string displayed in the "meeting memo" region 120, the association degree calculation unit 5 of the utterance presentation device 1 calculates the degree of association of each utterance among the utterances recorded during the meeting that has a recognition result thereof included in the utterance recognition data 14, with the specified character string. The UI control unit 4 performs control to select, for example, a predetermined number of utterances in descending order of the degree of association calculated by the association degree calculation unit 5 as utterances to be displayed, and to display the voice recognition results of the selected utterances in the "utterance list" region 110 of the UI screen 100.

In the example of the UI screen 100 in FIG. 10, the cursor 121 is matched with a line where a memo part saying "Speech synthesis? Related technology?" is entered among the meeting memos entered into the "meeting memo" region 120, and "speech synthesis" and "related technology" that are nouns obtained by applying a text analysis to this line serve as the specified character strings. In this case, the association degree calculation unit 5 calculates the degrees of association of each utterance that has a recognition result thereof included in the utterance recognition data 14 with "speech synthesis" and "related technology". As illustrated in FIG. 10, the UI control unit 4 displays the voice recognition results of utterances that have high degrees of association with "speech synthesis" and "related technology" among the utterances during the meeting, in the "utterance list" region 110.

The operation method for specifying a character string in the "meeting memo" region 120 is not limited to the method of matching the cursor 121. For example, the specification of a character string may be configured to be accepted using another operation method, such as range specification by a drag operation of a mouse.

For an utterance with the recognition result thereof not included in the utterance recognition data 14 because the assumed recognition accuracy thereof is below 50%, the UI control unit 4 displays words including at least a part of the specified character string among words stored as recognition keywords, in the "utterance list" region 110, together with the voice recognition results of the utterances selected as the utterances to be displayed. The display position of these words is determined based on the time of occurrence of the voice during the meeting. That is, the UI control unit 4 displays a recognition keyword including at least a part of the specified character string among the recognition keywords included in the utterance recognition data 14 with the assumed recognition accuracy of below 50% in a position in the "utterance list" region 110 corresponding to the time when the recognition keyword was uttered, using the above-described occurrence time during utterance. However, if a voice recognition result of an utterance with a high degree of association is displayed in that position, the recognition keyword is not displayed.

The example of the UI screen 100 in FIG. 10 illustrates that the voice recognition results of the utterances of "Tanaka" recorded using the sound collecting microphone 40 illustrated in FIG. 3 are not displayed in the "utterance list" region 110, but recognition keywords 114, such as "speech synthesis" and "related technology", included in the utterances of "Tanaka" are displayed therein. This is the example in which recognition keywords agreeing with "speech synthesis" and "related technology" specified by the user in the "meeting memo" region 120 among the recognition keywords in the utterance ID "12_s" are extracted in the example of the utterance recognition data 14 illustrated in FIG. 8, and are displayed in the "utterance list" region 110 based on the occurrence time during utterance of the recognition keywords. For time periods in which such recognition keywords are not present and no utterance is received by the individual microphones, an indication is preferably made by displaying, for example, " . . . ", as illustrated in FIG. 10, that the utterance has been recorded but the voice recognition result is not displayed.

In the example of the UI screen 100 in FIG. 10, the voice recognition results of utterances having low degrees of association calculated by the association degree calculation unit 5 among utterances with recognition results included in the utterance recognition data 14 are not displayed. However, even for the utterances having low degrees of association, only the head portions of the voice recognition results of the utterances may be displayed in the "utterance list" region 110.

The specific example of the method for calculating the degree of association by the association degree calculation unit 5 will be described. The association degree calculation unit 5 uses, for example, the following procedure to calculate the degree of association of each utterance with the specified character string. First, the association degree calculation unit 5 uses a morphological analysis to divide the text of the recognition result of each utterance included in the utterance recognition data 14 and the character string specified in the "meeting memo" region 120 into words. Then, assuming the entire text of the recognition result of each utterance included in the utterance recognition data 14 as a corpus, the association degree calculation unit 5 sets a weight for each of the divided words, using term frequency–inverse document frequency (tf–idf) for the text of the recognition result of each utterance serving as a document. The association degree calculation unit 5 generates an occurrence vector of the words weighted by tf–idf for the text of the recognition result of each utterance and the character string specified in the "meeting memo" region 120, and calculates a cosine similarity between the occurrence vector of the words generated for each utterance and the occurrence vector of the words generated for the character string specified in the "meeting memo" region 120. Then, the association degree calculation unit 5 calculates the sum of the cosine similarity of each utterance and the cosine similarities of a certain number of utterances before and after the utterance as a degree of association of the utterance with the character string specified in the "meeting memo" region 120. The association degree calculation unit 5 may calculate the cosine similarity of each utterance without adding the cosine similarities of utterances before and after the utterance. The association degree calculation unit 5 may generate the occurrence vector of the words of each utterance by including not only the words included in the recognition result of the utterance, but also the words (recognition keywords) included in the candidates for the recognition result.

In the case of calculating the degree of association using the method described above, the UI control unit 4 sorts the utterances with the recognition result thereof included in the utterance recognition data 14 in descending order of the degree of association calculated by the association degree calculation unit 5, and selects a predetermined number of higher order utterances as utterances to be displayed. The UI control unit 4 displays the voice recognition results of the utterances selected as the utterances to be displayed in the "utterance list" region 110 of the UI screen 100 in the chronological order of occurrence of the utterances.

The association degree calculation unit 5 may simply calculate the degree of association of each utterance based on whether the character string specified in the "meeting memo" region 120 is included in the text of the recognition result, without weighting the words using tf–idf as described above. In this case, the degree of association calculated by the association degree calculation unit 5 takes a binary value of "1" indicating that the character string specified in the "meeting memo" region 120 is included in the text of the recognition result, or "0" indicating that the character string specified in the "meeting memo" region 120 is not included in the text of the recognition result. The UI control unit 4 selects utterances with the degree of association calculated to be "1" by the association degree calculation unit 5 as the utterances to be displayed, and displays the voice recognition results of the utterances in the "utterance list" region 110 of the UI screen 100 in the chronological order of occurrence of the utterances.

The user who creates the meeting memos can check the content of the utterances related to the meeting memos entered into the "meeting memo" region 110, and can, for example, make an improvement of the meeting memos, such as supplementing insufficient information with new information, by referring to the voice recognition results of the utterances displayed in the "utterance list" region 110 of the UI screen 100, and reproducing the voices of utterances corresponding to the voice recognition results as needed.

As described above in detail by way of the specific examples, in the utterance presentation device 1, the utterance recording unit 2 records the utterances recorded during the meeting, and the voice recognition unit 3 performs the voice recognition on the utterances. The UI control unit 4 displays the UI screen 100 including the "utterance list" region 110 and the "meeting memo" region 120 on the client terminal. If a character string is specified in the "meeting memo" region 120, the association degree calculation unit 5 calculates the degree of association of each of the voice-recognized utterances with the character string specified in the "meeting memo" region 120. The UI control unit 4 selects utterances with high degrees of association calculated by the association degree calculation unit 5 as utterances to be displayed, and displays the voice recognition results of the selected utterances in the "utterance list" region 110 of the UI screen 100. As a result, this utterance presentation device 1 can present the utterances corresponding to any information entered into the "meeting memo" region 120 to a user in an easily understandable way to allow the user to check the utterances, and thus can appropriately support operations of the user, such as the creation of the meeting memos.

Second Embodiment

The following describes a second embodiment of the present invention. The present embodiment differs from the first embodiment described above in the method for calculating the degree of association by the association degree calculation unit 5. Since the basic configuration and operation of the utterance presentation device 1 are the same as those of the first embodiment, the following does not repeat the description of components common to those of the first embodiment, and describes only differences from the first embodiment.

Instead of using only the text of the recognition result to calculate the degree of association of each utterance, the association degree calculation unit 5 of the present embodiment uses various documents related to the meeting to calculate the topic of the text, and uses the topic to calculate the degree of association. The topic refers to a broad meaning of the text, and is calculated using a topic analysis technique, such as latent Dirichlet allocation (LDA).

Figure 12:
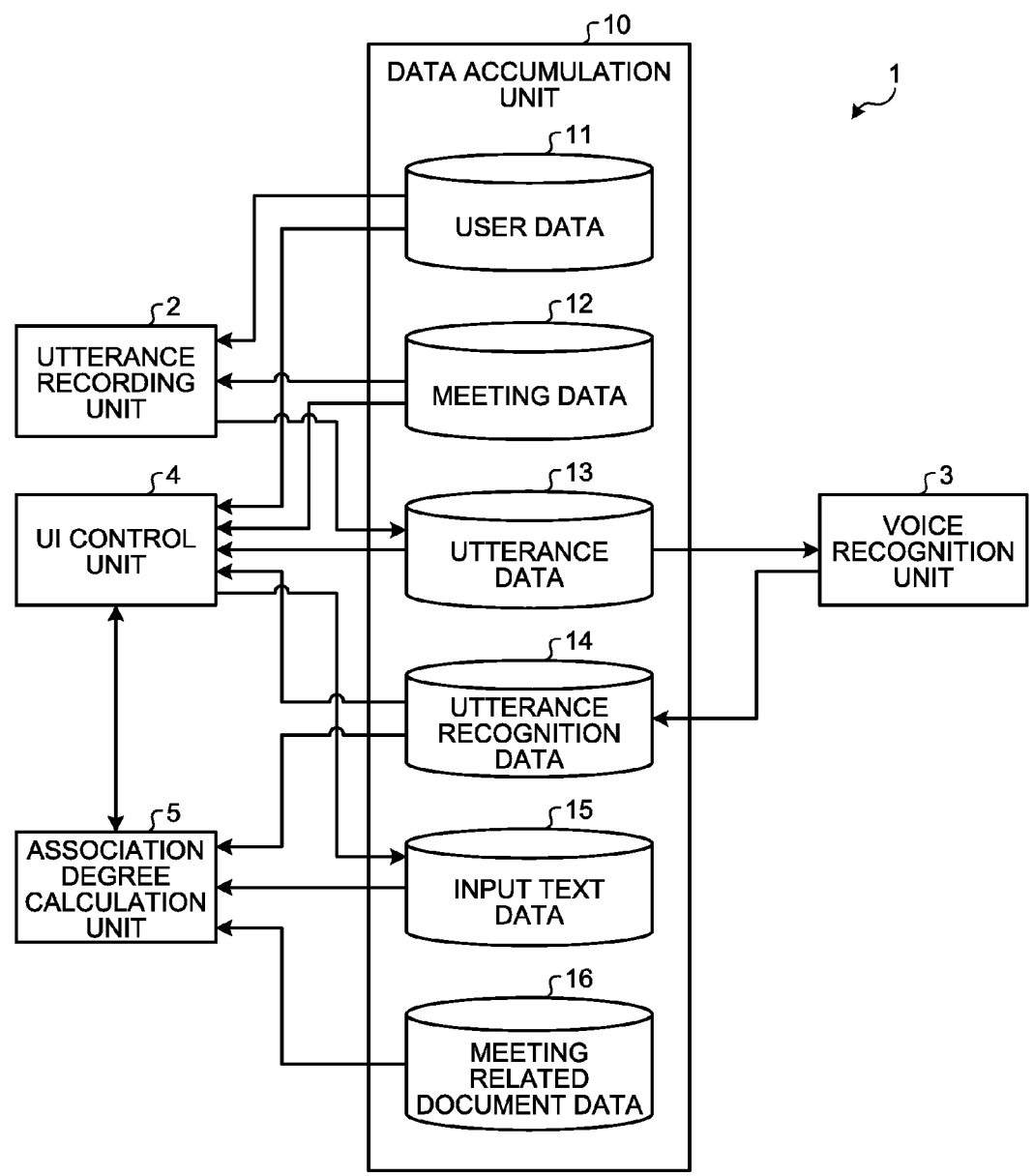
FIG. 12 is a block diagram illustrating a configuration example of the utterance presentation device according to a second embodiment of the present invention.

FIG. 12 is a block diagram illustrating a configuration example of the utterance presentation device 1 according to the present embodiment. The configuration of the utterance presentation device 1 of the present embodiment differs from that of the utterance presentation device 1 of the first embodiment illustrated in FIG. 1 in that meeting related document data 16 is added as data accumulated in the data accumulation unit 10, and in that the association degree calculation unit 5 uses the meeting related document data 16 to calculate the degree of association of each utterance. The meeting related document data 16 is, for example, data obtained by aggregating the utterance recognition data 14 and the input text data 15 of other related meetings stored in the data accumulation unit 10 with respect to a certain meeting. For example, documents on subjects related to the meeting that have been obtained by crawling through the Internet may be used as the meeting related document data 16.

The association degree calculation unit 5 of the present embodiment uses, for example, the following procedure to calculate the degree of association of each utterance with the specified character string. First, the association degree calculation unit 5 uses the morphological analysis to divide the text of the recognition result of each utterance included in the utterance recognition data 14 and the character string specified in the "meeting memo" region 120 into words. Then, assuming the entire text of the recognition result of each utterance included in the utterance recognition data 14 and the meeting related document data 16 as a corpus, the association degree calculation unit 5 uses, for example, the LDA to generate words representing the topic and a vector including columns of weights the words for the text of the recognition result of each utterance and the character string specified in the "meeting memo" region 120, and calculates the cosine similarity between the vector generated for each utterance and the vector generated for the character string specified in the "meeting memo" region 120. Then, the association degree calculation unit 5 calculates the sum of the cosine similarity of each utterance and the cosine similarities of a certain number of utterances before and after the utterance as a degree of association of the utterance with the character string specified in the "meeting memo" region 120. The association degree calculation unit 5 may calculate the cosine similarity of each utterance without adding the cosine similarities of utterances before and after the utterance. A technique other than the LDA, such as latent semantic indexing (LSI), may be used for calculating the topic.

As described above, in the present embodiment, the association degree calculation unit 5 uses the similarity between the topic of each utterance and the topic of the specified character string to calculate the degree of association of each utterance with the specified character string. Consequently, the degree of association of each utterance with the specified character string can be calculated more accurately than in the first embodiment.

Third Embodiment

The following describes a third embodiment of the present invention. The present embodiment is an example in which the "utterance list" region 110 of the UI screen 100 displays not only the voice recognition results of the utterances corresponding to the character string specified in the "meeting memo" region 120 of the UI screen 100, but also the voice recognition results of the utterances corresponding to the character string selected based on the structure of the character string displayed in the "meeting memo" region 120. Since the basic configuration and operation of the utterance presentation device 1 are the same as those of the first embodiment, the following does not repeat the description of components common to those of the first embodiment, and describes only differences from the first embodiment.

For example, in the case of specifying a character string using the method of matching the cursor 121 with any line in the "meeting memo" region 120, in the first embodiment, the "utterance list" region 110 displays the voice recognition result of an utterance corresponding to a character string in the line matched with the cursor 121 among character strings displayed in the "meeting memo" region 120. In the present embodiment, however, indents in the "meeting memo" region 120 are used to understand the text structure, and the "utterance list" region 110 also displays the voice recognition results of utterances corresponding to a header at a higher level of the subject in the line matched with the cursor 121.

Figure 13:
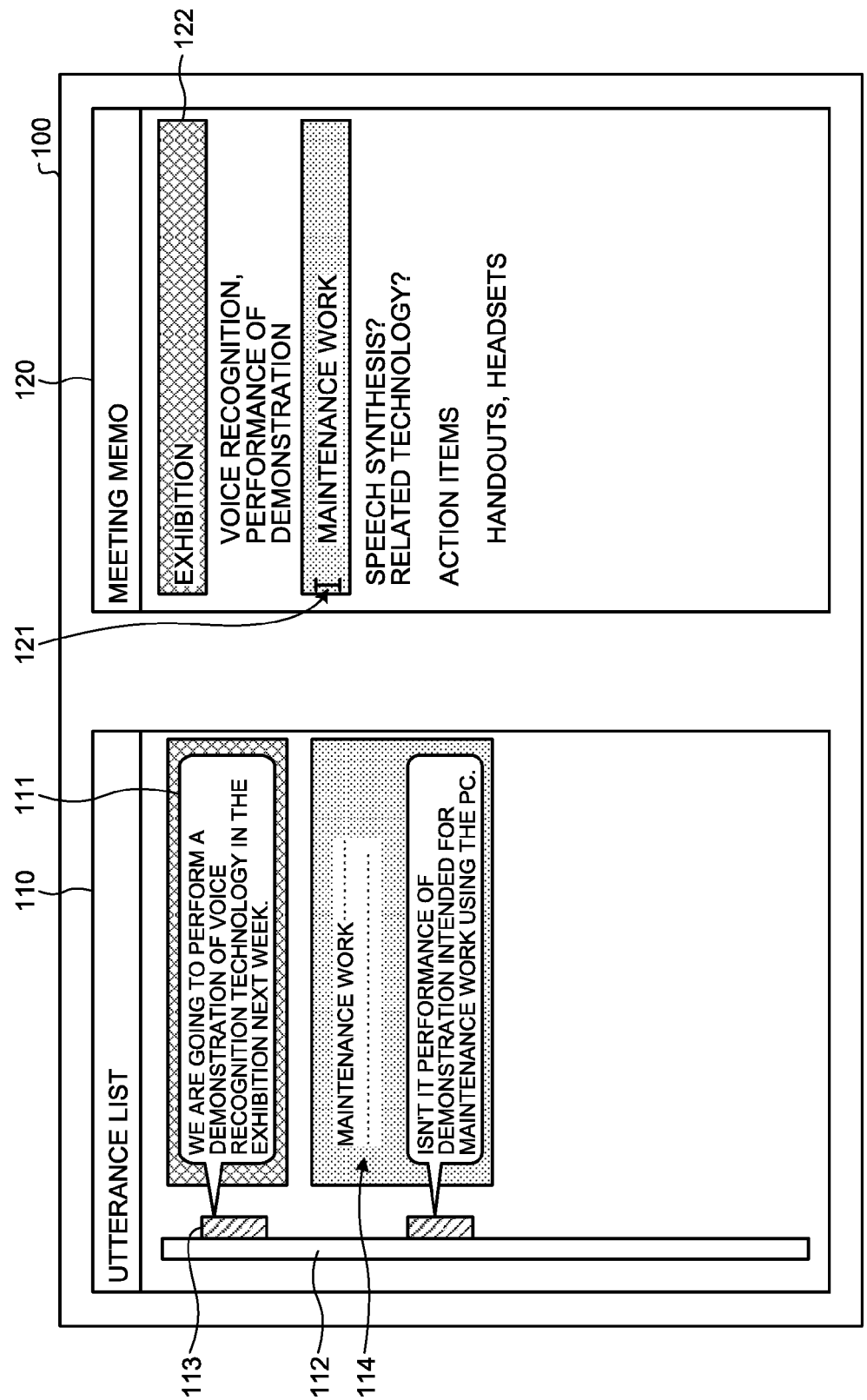
FIG. 13 is a diagram illustrating an example of the UI screen in a third embodiment of the present invention.

FIG. 13 is a diagram illustrating an example of the UI screen 100 displayed on the client PC 20 in the present embodiment. In the example of the UI screen 100 in FIG. 13, the cursor 121 is matched with a line where a memo part saying "maintenance work" is entered among the meeting memos entered into the "meeting memo" region 120, and this "maintenance work" serves as the specified character string. An indent with a depth of one space character is set at the head of the line in which "maintenance work" is entered whereas no indent is set at the head of a line 122 that is two lines above the above-mentioned line and in which a memo part saying "exhibition" is entered. Thus, the character string "exhibition" in the line 122 is inferred to be a header at a level higher than "maintenance work" serving as the specified character string.

In this case, the association degree calculation unit 5 calculates the degree of association of each utterance that has a recognition result thereof included in the utterance recognition data 14 with "maintenance work" serving as the specified character string, and in addition, with "exhibition". As illustrated in FIG. 13, the UI control unit 4 displays the voice recognition results of utterances that have high degrees of association with "maintenance work" and the voice recognition results of utterances that have high degrees of association with "exhibition" among the utterances during the meeting, in the chronological order in the "utterance list" region 110. If "maintenance work" and "exhibition" are included in the recognition keywords in utterances for which the recognition results are not stored because of low assumed recognition accuracy in the same manner as in the first embodiment, the recognition keywords are displayed in positions corresponding to times when the recognition keywords were uttered.

To clarify correspondence relations between the character strings in the "meeting memo" region 120 and the voice recognition results of utterances displayed in the "utterance list" region 110, for example, a method is preferably used in which the backgrounds of the specified character string in the "meeting memo" region 120 and the corresponding voice recognition result of the utterance in the "utterance list" region 110 are displayed in the same color, and the backgrounds of the character string selected based on the text structure in the "meeting memo" region 120 and the corresponding voice recognition result of the utterance in the "utterance list" region 110 are displayed in the same color. In the example of the UI screen 100 in FIG. 13, the line in the "meeting memo" region 120 in which "maintenance work" is entered and the voice recognition result of the utterance and the recognition keyword in the "utterance list" region 110 corresponding to "maintenance work" are displayed on the backgrounds having the same color, and the line in the "meeting memo" region 120 in which "exhibition" is entered and the voice recognition result of the utterance in the "utterance list" region 110 corresponding to "exhibition" are displayed on the backgrounds having the same color.

As described above, in the present embodiment, not only the voice recognition results of the utterances corresponding to the character string specified by the user but also the voice recognition results of the utterances corresponding to, for example, the header at a level higher than the character string are presented. Consequently, operations of the user, such as the creation of the meeting memos, can be more appropriately supported.

Fourth Embodiment

The following describes a fourth embodiment of the present invention. The present embodiment is an example in which, in the setting of the assumed recognition accuracy, not only the recording microphone type is set, but also several pieces of the sound recording environment data are prepared in advance, and individual setting is made on a meeting-by-meeting basis, and on a user-by-user basis. Since the basic configuration and operation of the utterance presentation device 1 are the same as those of the first embodiment, the following does not repeat the description of components common to those of the first embodiment, and describes only differences from the first embodiment.

Figure 14:
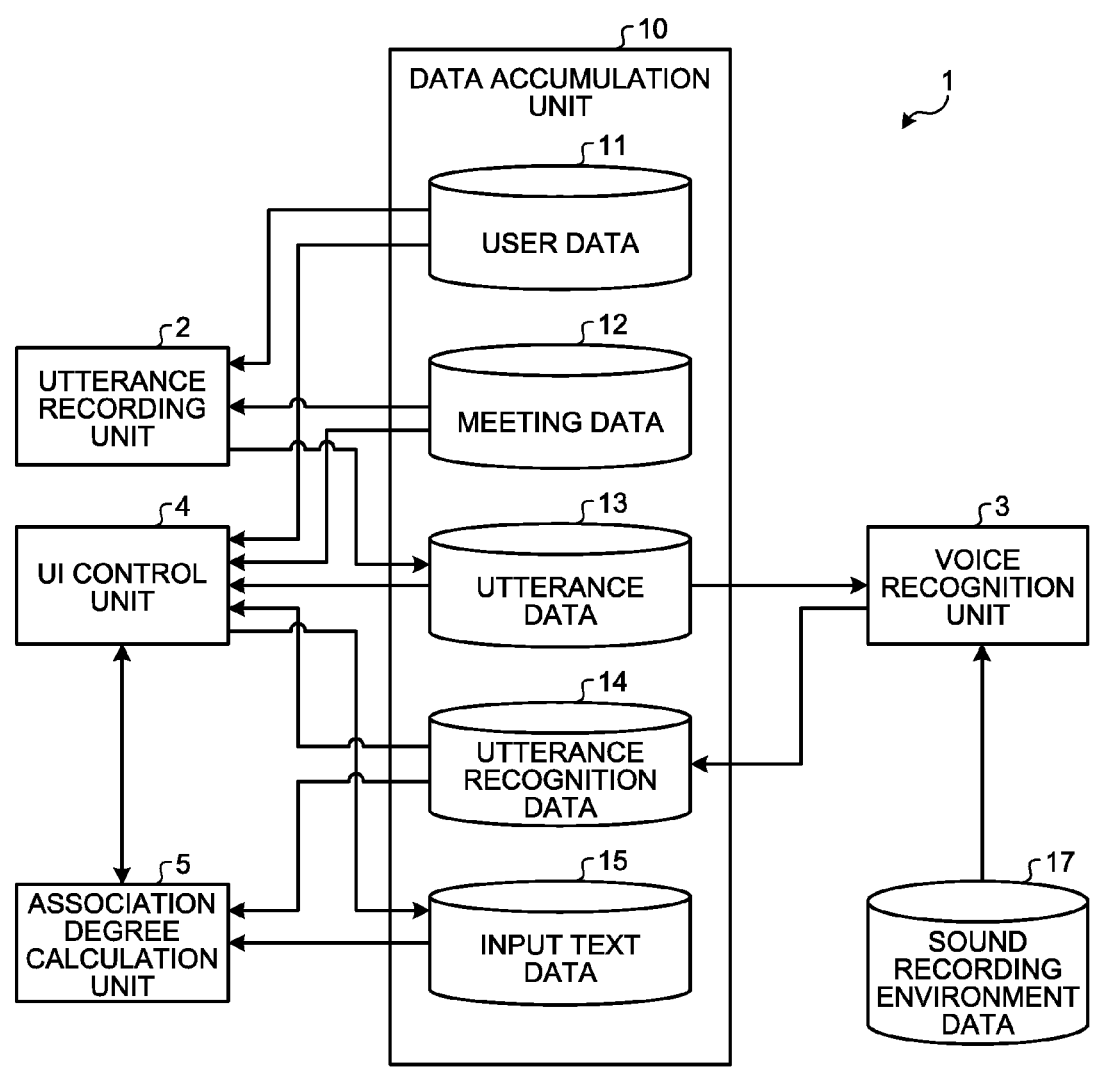
FIG. 14 is a block diagram illustrating a configuration example of the utterance presentation device according to a fourth embodiment of the present invention.

FIG. 14 is a block diagram illustrating a configuration example of the utterance presentation device 1 according to the present embodiment. The configuration of the utterance presentation device 1 of the present embodiment differs from that of the utterance presentation device 1 of the first embodiment illustrated in FIG. 1 in that sound recording environment data 17 is added, and the voice recognition unit 3 sets the assumed recognition accuracy of each utterance with reference to the sound recording environment data 17. In the sound recording environment data 17, the assumed recognition accuracy is set for each recording microphone type, and for each of the conditions, such as whether the utterance is that of a particular user, whether the utterance has been recorded at a particular location, and whether the recorded voice of the utterance has been post-processed.

FIG. 15 is a diagram illustrating a specific example of the sound recording environment data 17. The sound recording environment data 17 has a form of associating with one another a unique data ID assigned to an individual piece of data, the recording microphone type, the user ID of the speaking user, the location where the utterance was recorded, whether post-processing has been applied, and the assumed recognition accuracy, for example, as illustrated in FIG. 15. In the example of the sound recording environment data 17 in FIG. 15, items with content indicated as "*" represent a setting that does not specify the speaking user or the location where the utterance was recorded. "Speaker verification" represents the post-processing of separating the voice recorded using the sound collecting microphone 40 among respective speakers using acoustic characteristics of voices of the speakers. The form of FIG. 15 is merely an example. The sound recording environment data 17 may include other information.

When setting the assumed recognition accuracy of the utterance recognition data 14, the voice recognition unit 3 of the present embodiment uses the sound recording environment data 17 described above. Which of the conditions is met by each utterance is identified using, for example, the meeting data 12 about the meeting registered using the meeting setting screen at the time of registration and the utterance data 13 of the utterance recorded during the meeting.

Figure 16:
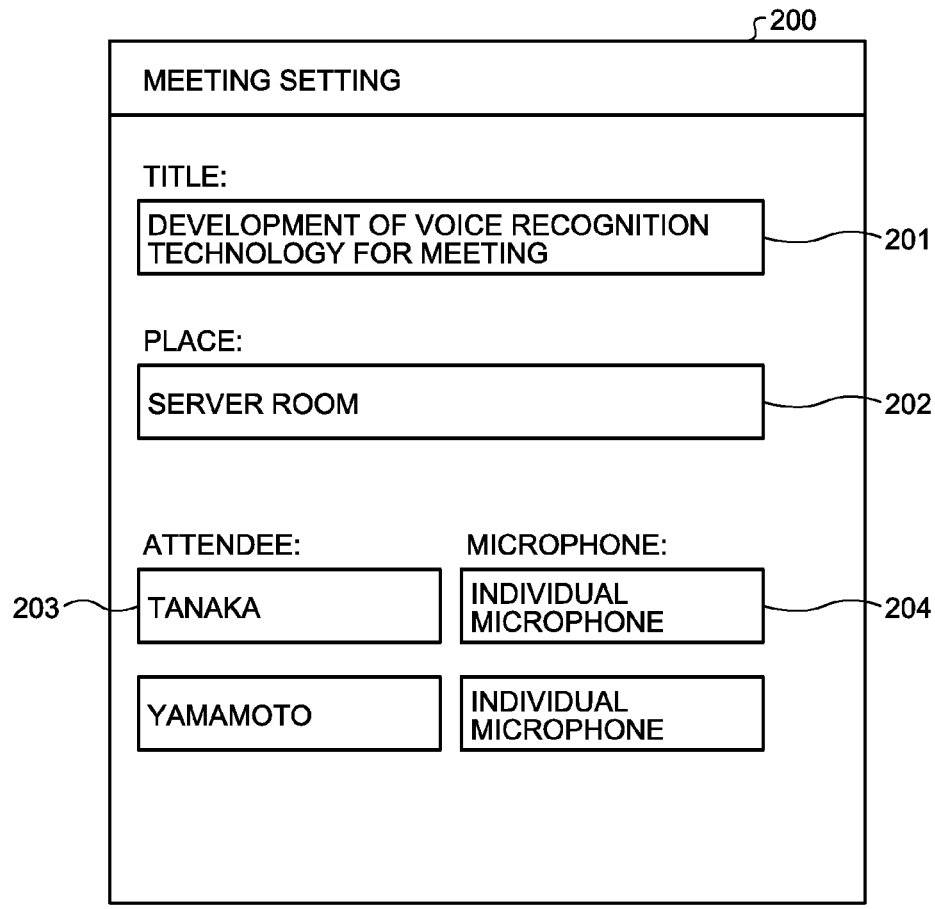
FIG. 16 is a diagram illustrating an example of a meeting setting screen.

FIG. 16 is a diagram illustrating an example of the meeting setting screen. This meeting setting screen 200 illustrated in FIG. 16 is provided with a text box 201 for entering the title of the meeting, a text box 202 for entering the place where the meeting is held (place where utterances are recorded), text boxes 203 for entering attendees of the meeting (meeting participants), and text boxes 204 for entering types of microphones used for recording the utterances of the attendees (recording microphone types).

The example of the meeting setting screen 200 in FIG. 16 illustrates that the place where the meeting is held (place where the utterances are recorded) is "Server room". Hence, a condition with a data ID of "4_d" is met in the sound recording environment data 17 illustrated in FIG. 15, and thus, the assumed recognition accuracy is set to "60%". This indicates that the assumed recognition accuracy of an utterance recorded using an individual microphone drops from 80% to 60% because the voice recognition accuracy of an utterance recorded in a noisy environment, such as the server room, is assumed to be lower than the voice recognition accuracy of an utterance recorded in a less noisy environment.

If conditions of a plurality of pieces of data included in the sound recording environment data 17 are met, the assumed recognition accuracy is set to the lowest of the assumed recognition accuracy values indicated by the pieces of data. For example, the example of the meeting setting screen 200 in FIG. 16 illustrates that "Oshima" with a user ID of "2_u" attends the meeting, so that utterances of "Oshima" in this meeting meet both a condition with a data ID of "3_d" and the condition with the data ID of "4_d" in the sound recording environment data 17 illustrated in FIG. 15. In this case, the assumed recognition accuracy of 90% for the data ID of "3_d" is compared with the assumed recognition accuracy of 60% for the data ID of "4_d", and the assumed recognition accuracy of the utterances of "Oshima" is set to the lower value of 60%.

As described above, in the present embodiment, not only the recording microphone types are set, but also the assumed recognition accuracy is set taking into account various conditions related to the recording of the utterances. Consequently, the assumed recognition accuracy can be more accurately set.

The assumed recognition accuracy set as described above is used for determining whether to store the recognition results as the utterance recognition data 14, as described in the first embodiment, and in addition, can be used by the UI control unit 4 for selecting the utterances for which the recognition results are to be displayed in the "utterance list" region 110 of the UI screen 100. That is, the UI control unit 4 may use the assumed recognition accuracy set by the voice recognition unit 3 in addition to the degree of association with the specified character string calculated by the association degree calculation unit 5 to select the utterances for which the recognition results are to be displayed in the "utterance list" region 110.

Specifically, the UI control unit 4 uses, for example, the calculation method described in the first and second embodiments to obtain, as a score for each utterance, a value obtained by multiplying the degree of association calculated by the association degree calculation unit 5 by the assumed recognition accuracy set by the voice recognition unit 3, sorts the respective utterances in descending order of the obtained scores, and selects a predetermined number of higher order utterances as utterances to be displayed. The UI control unit 4 displays the voice recognition results of the utterances selected as the utterances to be displayed in the "utterance list" region 110 of the UI screen 100 in the chronological order of occurrence of the utterances. This can preferentially present the utterances with particularly higher assumed recognition accuracy among utterances with high degree of association with the specified character string to the user. For utterances with very low voice recognition accuracy, the recognition keywords agreeing with the specified character string may be omitted from being displayed.

Supplementary Explanation

The above has exemplified the utterance presentation device 1 that is configured to record the utterances during the meeting and to present utterances corresponding to any character strings specified by the user as the utterance presentation device of the embodiments. The utterance presentation device of the embodiments can be configured as a device that records not only the utterances during the meeting but also various vocal utterances, and that presents utterances corresponding to any character strings specified by the user.

The functional components in the utterance presentation device 1 of the embodiments described above can be implemented by a computer program (software) executed using, for example, a general-purpose computer system as basic hardware.

Figure 17:
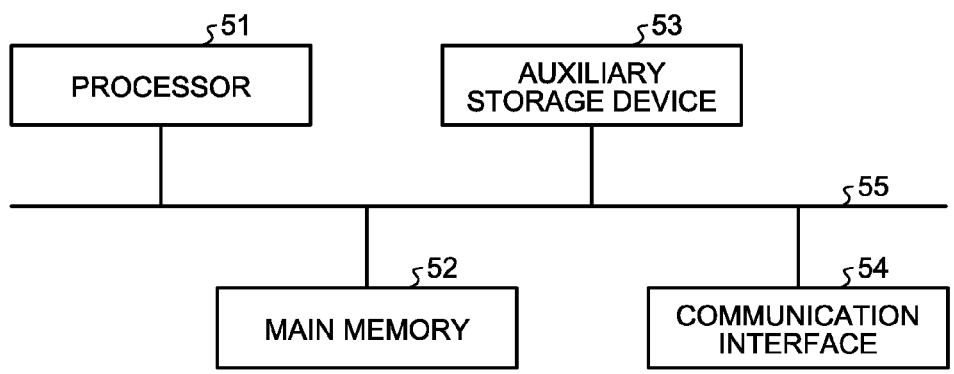
FIG. 17 is a block diagram schematically illustrating an example of the hardware configuration of the utterance presentation device.

FIG. 17 is a block diagram schematically illustrating an example of the hardware configuration of the utterance presentation device 1. As illustrated in FIG. 17, the utterance presentation device 1 of the embodiments is configured as a general-purpose computer system that includes a processor 51, such as a central processing unit (CPU), a main memory 52, such as a random access memory (RAM), an auxiliary storage device 53 using various memory units, a communication interface 54, and a bus 55 connecting these components. The auxiliary storage device 53 may be connected to the components through, for example, a wired or wireless local area network (LAN).

The components (the utterance recording unit 2, the voice recognition unit 3, the UI control unit 4, and the association degree calculation unit 5) of the utterance presentation device 1 according to the embodiments are implemented by, for example, executing a computer program stored in the auxiliary storage device 53 on the processor 51 using the main memory 52. The data accumulation unit 10 is implemented, for example, using the auxiliary storage device 53.

The program to be executed by the processor 51 is provided as a computer program product, for example, by being recorded as a file in an installable or executable format on a computer-readable recording medium, such as a compact disc read-only memory (CD-ROM), a flexible disk (FD), a compact disc recordable (CD-R), or a digital versatile disc (DVD).

This program may be stored on another computer connected to a network, such as the Internet, and provided by being downloaded through the network. This program may be provided or distributed through a network, such as the Internet. This program may be provided by being embedded in advance in, for example, a ROM (auxiliary storage device 53) in the computer.

This program has a modular structure including the functional components of the utterance presentation device 1 of the embodiments. As actual hardware, for example, the processor 51 reads the program from the recording medium mentioned above, and executes the program to load the above-described components into the main memory 52, thus generating the above-described components in the main memory 52. One, some, or all of the functional components of the utterance presentation device 1 of the embodiments can be implemented using special-purpose hardware, such as an application specific integrated circuit (ASIC) or a field-programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An utterance presentation device comprising:
   an utterance recording unit configured to record vocal utterances;
   a voice recognition unit configured to recognize the recorded utterances by voice recognition;
   an association degree calculation unit configured to calculate degrees of association of the recognized utterances with a character string specified from among character strings displayed in a second display region of a user interface (UI) screen having a first display region and the second display region; and
   a UI control unit configured to display voice recognition results of utterances that satisfy a predetermined criterion for accuracy of voice recognition assumed based on an input method of a voice and that have been selected based on the degrees of association, in the first display region of the UI screen, wherein
   the UI control unit is configured to display words including at least a part of the specified character string among words included in candidates for voice recognition results of utterances not satisfying the criterion for the accuracy, the first display region, together with the voice recognition results of the selected utterances.

2. The device according to claim 1, wherein the UI control unit is configured to display the voice recognition results of the selected utterances in the first display region in the chronological order of occurrence of the utterances.

3. The device according to claim 1, wherein the UI control unit is configured to determine positions where the words are displayed in the first display region based on times when voices corresponding to the words occur.

4. The device according to claim 1, wherein the accuracy is assumed based on at least one of an input environment of a voice and whether the voice is post-processed, in addition to the input method of the voice.

5. The device according to claim 1, wherein the UI control unit is configured to display the voice recognition results of the utterances selected based on the degrees of association and the accuracy in the first display region.

6. The device according to claim 1, wherein the specified character string is a character string specified based on an operation on the second display region by a user.

7. The device according to claim 1, wherein
the association degree calculation unit is configured to calculate the degrees of association of the recognized utterances with the specified character string and degrees of association of the recognized utterances with a character string selected based on a structure of the character string displayed in the second display region; and
the UI control unit is configured to display the voice recognition results of the utterances selected based on the degrees of association with the specified character string and voice recognition results of utterances selected based on the degrees of association with the selected character string, in the first display region.

8. The device according to claim 1, wherein the UI control unit is configured to, in response to an operation of specifying a voice recognition result displayed in the first display region, reproduce a voice of an utterance corresponding to the voice recognition result.

9. The device according to claim 1, wherein the association degree calculation unit is configured to calculate a degree of association of an utterance with the specified character string based on whether at least a part of the specified character string is included in a voice recognition result of the utterance or candidates for the voice recognition result.

10. The device according to claim 1, wherein the association degree calculation unit is configured to generate an occurrence vector of words included in the specified character string, the occurrence vector being obtained by weighting the words using tf–idf, to generate occurrence vectors of words included in the voice recognition results of the recognized utterances, the occurrence vectors being obtained by weighting the words using the tf–idf, and to calculate the degrees of association of the utterances with the specified character string based on cosine similarities between the occurrence vectors of the words generated for the utterances and the occurrence vector of the words generated for the specified character string.

11. The device according to claim 10, wherein when an utterance for which a degree of association is to be calculated is defined as a target utterance, and a predetermined number of utterances occurring at times proximate to that of the target utterance are defined as proximate utterances, the association degree calculation unit is configured to calculate each of the degrees of association by adding cosine similarities between occurrence vectors of words generated for the proximate utterances and the occurrence vector of the words generated for the specified character string to a cosine similarity between an occurrence vector of words generated for the target utterance and the occurrence vector of the words generated for the specified character string.

12. The device according to claim 1, wherein the association degree calculation unit is configured to generate words representing a topic for the specified character string and a vector including columns of weights of the words, to generate words representing topics for the recognized utterances and vectors including columns of weights of the words, and to calculate the degrees of association of the utterances with the specified character string based on cosine similarities between the vectors generated for the utterances and the vector generated for the specified character string.

13. The device according to claim 12, wherein when an utterance for which the degree of association is to be calculated is defined as a target utterance, and a predetermined number of utterances occurring at times proximate to that of the target utterance are defined as proximate utterances, the association degree calculation unit is configured to calculate each of the degrees of association by adding cosine similarities between vectors generated for the proximate utterances and a vector generated for the specified character string to a cosine similarity between a vector generated for the target utterance and the vector generated for the specified character string.

14. An utterance presentation method executed by an utterance presentation device, the method comprising:
recording vocal utterances;
recognizing the recorded utterances by voice recognition;
calculating degrees of association of the recognized utterances with a character string specified from among character strings displayed in a second display region of a UI screen having a first display region and the second display region; and
displaying voice recognition results of utterances that satisfy a predetermined criterion for accuracy of voice recognition assumed based on an input method of a voice and that have been selected based on the degrees of association in the first display region of the UI screen, wherein
the displaying displays words including at least a part of the specified character string among words included in candidates for voice recognition results of utterances not satisfying the criterion for the accuracy, in the first display region, together with the voice recognition results of the selected utterances.

15. A computer program product comprising a non-transitory computer-readable medium including programmed instructions, the instructions causing a computer to execute:
recording vocal utterances;
recognizing the recorded utterances by voice recognition;
calculating degrees of association of the recognized utterances with a character string specified from among character strings displayed in a second display region of a UI screen having a first display region and the second display region; and
displaying voice recognition results of utterances that satisfy a predetermined criterion for accuracy of voice recognition assumed based on an input method of a voice than that have been selected based on the degrees of association in the first display region of the UI screen, wherein
the displaying displays words including at least a part of the specified character string among words included in candidates for voice recognition results of utterances not satisfying the criterion for the accuracy, in the first display region, together with the voice recognition results of the selected utterances.

\* \* \* \* \*